United States Patent [19]

Kato

[11] 4,004,551
[45] Jan. 25, 1977

[54] BREEDING AQUARIUM HAVING FILTERING CHAMBER THEREIN

[76] Inventor: Yukio Kato, No. 2-1, Hanegi 2-chome, Setagaya, Tokyo, Japan

[22] Filed: May 23, 1975

[21] Appl. No.: 580,142

[30] Foreign Application Priority Data

Jan. 30, 1975 Japan .............................. 50-12979
Jan. 30, 1975 Japan .............................. 50-12978
Jan. 30, 1975 Japan .............................. 50-12977

[52] U.S. Cl. .................................................. 119/5
[51] Int. Cl.² ....................................... A01K 63/00
[58] Field of Search .................. 119/5, 3; 210/169

[56] References Cited
UNITED STATES PATENTS 3,151,069  9/1964  Halpert .............................. 119/5 X
3,247,826  4/1966  Girard ................................. 119/5

Primary Examiner—Hugh R. Chamblee
Attorney, Agent, or Firm—McGlew and Tuttle

[57] ABSTRACT

A breeding aquarium having a filtering chamber therein to allow the space above the filtering chamber to be utilized as a part of the breeding chamber to extend the space of the breeding chamber. The filtering chamber extends throughout the width of the aquarium and water is passed through the filter layer horizontally, so that the filtering efficiency is high for a small size of the filter chamber. The filter layer is a dual layer consisting of the lower layer having a lower resistance to the flow of water and the upper layer having a higher resistance. An auxiliary filter consisting of a net of a synthetic resin, glass wool, or the like is inserted in the circulation path of water to preliminarily filter the water so that the stopping up of the small holes formed in the partition plates defining various chambers is prevented. A reflector plate is provided to convert a part of the circulating water into an ascending current to agitate the water existing above the filter chamber so that the agitated water can better absorb air or oxygen to feed filtering fungi and to increase the chance of the agitated water to contact a biotic membrane of the filtering fungi to more effectively purify water. The filter chamber can be utilized as an aquatic plant culturing chamber by planting the upper layer of the filter layer with aquatic plants still retaining a filtering function as an auxiliary filter chamber. In this case a main filter chamber is provided.

9 Claims, 6 Drawing Figures

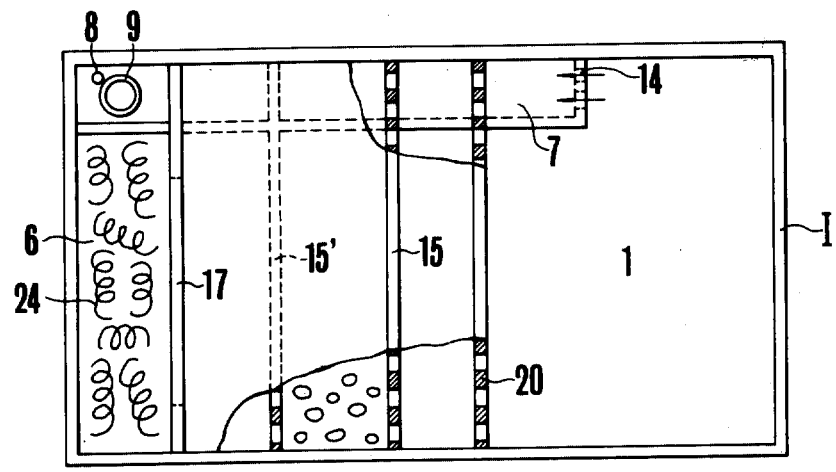
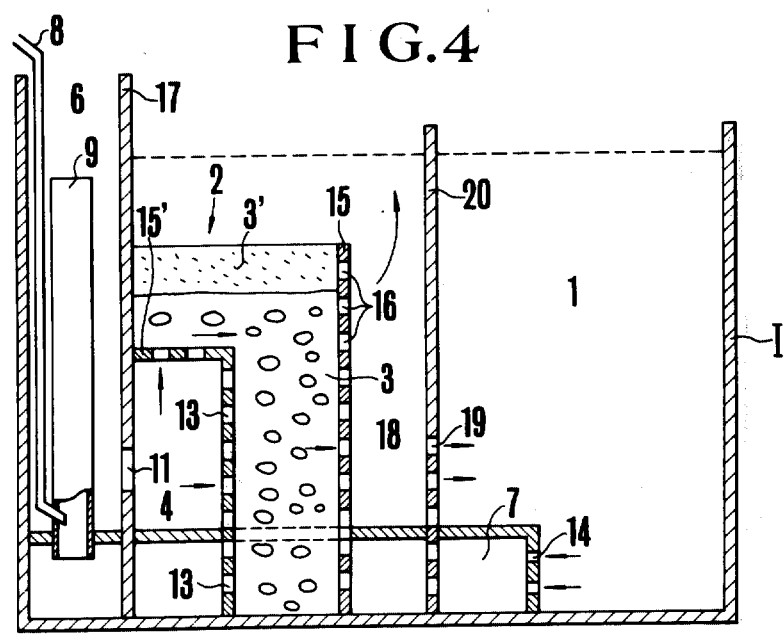

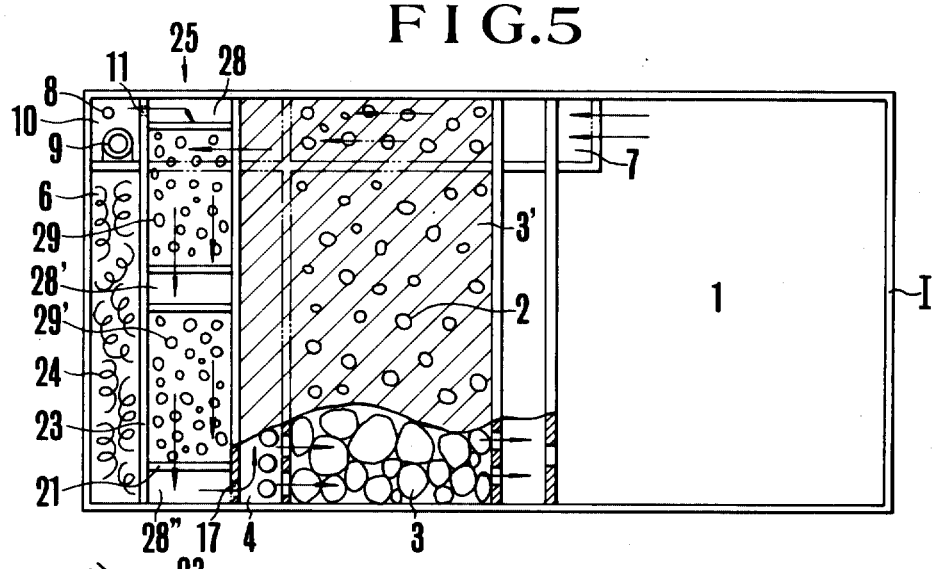
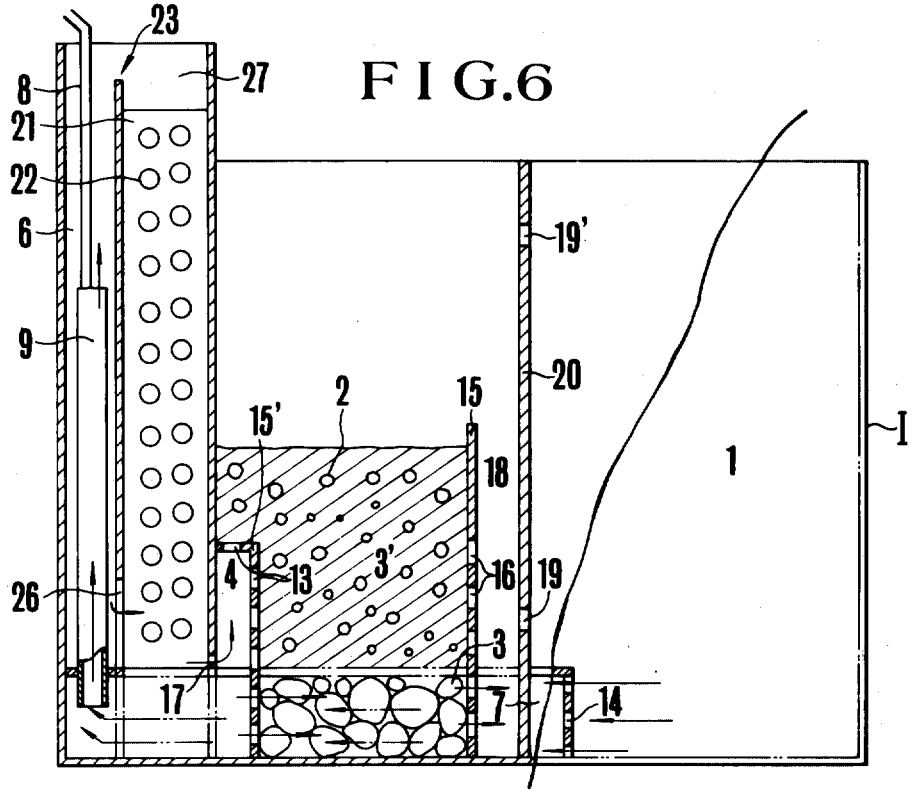

4,004,551

BREEDING AQUARIUM HAVING FILTERING CHAMBER THEREIN

BACKGROUND OF THE INVENTION

1. Field of the Invention

The present invention relates to a breeding aquarium equipped with a water purifying filter, and more particularly, to a breeding aquarium having a filter chamber therein.

2. Description of the Prior Art

In a conventional breeding aquarium equipped with a filtering chamber therein, known as the flow-down type one, the water lifted by an air pump flows down vertically through the filter material or medium housed in the filtering chamber. This type of aquarium has the advantage that since the water passing through the filter material contains air or oxygen resolved therein or mixed therewith, it is favorable to the propagation of filtering fungi which have the function of purifying water. However, this known aquarium has the disadvantage that the size of the breeding chamber is relatively small, otherwise the size of the overall arrangement becomes large. If, to overcome this disadvantage, the size of the filter chamber is made small, another disadvantage arises that not only the filtering capacity is reduced, but also the filter material must be frequently regenerated.

A bottom filtering type of aquarium is also known. However, this type of aquarium has the disadvantage that since the surface of the filter medium is exposed to the breeding chamber, sewage directly contacts the filter medium to stop it up. The stopping up of the filter medium causes the reduction of the amount of water passing through the filter medium, resulting in the shortage of oxygen to be supplied to filtering fungi and at the same time the generation of anaerobic bacteria, so that the purifying ability is reduced.

An aquarium is also known in which aquatic plants are also accessorily cultured therein. However, the thickness of the earth for planting is required to be 5 cm or more, so that if the filter layer is utilized for planting in the flow-down type of aquarium, the passage of water is obstructed by the plants. If exclusive planting earth is provided instead of utilizing the filtering medium or material as the planting earth, water does not flow through the earth because of its large thickness of 5 cm or more, thus adversely affecting the growth of plants and resulting in root rot. The root rot is a source of sewage in the aquarium.

SUMMARY OF THE INVENTION

An object of the present invention is to provide a breeding aquarium having a relatively large breeding chamber with a high filtering efficiency for a small filtering chamber.

Another object of the present invention is to provide a breeding aquarium having a means for further expediting the ability of purification in addition to the filter material in the filtering chamber.

A further object of the present invention is to provide a breeding aquarium having a water purifying ability in which aquatic plants are also cultured without losing the water purifying ability.

According to the present invention the filter chamber is submerged in the aquarium so that the space above the filtering chamber can be utilized as a part of the breeding chamber to extend the breeding space. The filtering chamber is arranged throughout the width of the aquarium and water is passed horizontally through the filter layer, so that the filtering efficiency is high for a small size of filter chamber. The filter layer according to the present invention is a dual layer consisting of the lower layer having a lower resistance to the flow of water and the upper layer having a higher resistance to the flow of water. Normally, water passes mainly through the lower layer horizontally. However, if the lower layer is stopped up after a long time use, water is by-passed upwards. This, indicates the time when the filter material must be regenerated. Thus, the regeneration time of filter can be easily known.

According to the present invention an auxiliary filtering material such as a net made of a synthetic resin, glass wool, or the like is placed in the circulation path of water to prevent the stopping up of the small holes formed in the partition plates defining various chambers by preliminarily filtering water.

According to the present invention a reflector plate is inserted in the circulation path of water for converting a part of the circulating water into an ascending current to agitate the water existing above the filter chamber. By this agitation the absorption of air or oxygen into the agitated water is accelerate, which is favorable to the propagation of filtering fungi to generate a biotic film or membrane (a gelatinous membrane of microaerobion or aeroic microorganism) on the surface on the filter material. The biotic membrane biochemically decomposes organic substance in water to purify the water. The agitation also increases the chance of contact of the organic substance in the water with the biotic membrane to accelerate the purification. Thus, the purification of water by the biotic membrane is added to the purification by the filter material in the filtering chamber. Consequently, the purifying ability becomes very high.

According to the present invention a chamber is submergely located in the aquarium as an auxiliary filter chamber correspondingly to the above-mentioned filter chamber. The chamber is filled with pebbles overlaid with a filter aggregate similarly to the filter chamber. The overlying filter aggregate is planted with aquatic plants. Thus, the chamber is in fact a plant culturing chamber having a function of filter. In this case a amin filter chamber is also provided in the aquarium which consists of alternate open spaces and filtering sections to increase the ability of purification. A path for overflow is provided over the main filter chamber.

BRIEF DESCRIPTION OF THE DRAWINGS

FIG. 3 is a plan view, partly in cross-section, of another embodiment of the present invention.

FIG. 4 is a side view, in cross-section, of the embodiment of FIG. 3.

FIG. 5 is a plan view, partly in cross-section, of a further embodiment of the present invention.

FIG. 6 is a side view, partly in cross-section, of the embodiment of FIG. 5.

DESCRIPTION OF THE PREFERRED EMBODIMENT

Figure 1:
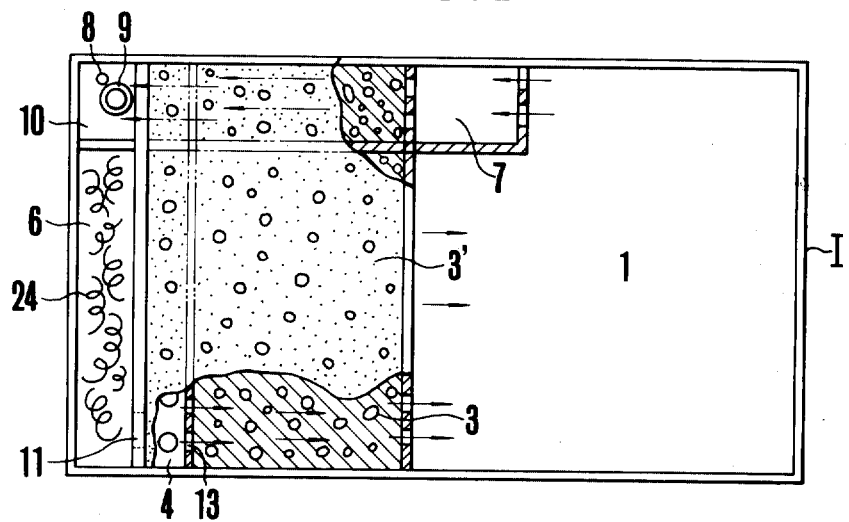
FIG. 1 is a plan view, partly in cross-section, of an embodiment of the present invention.
Figure 2:
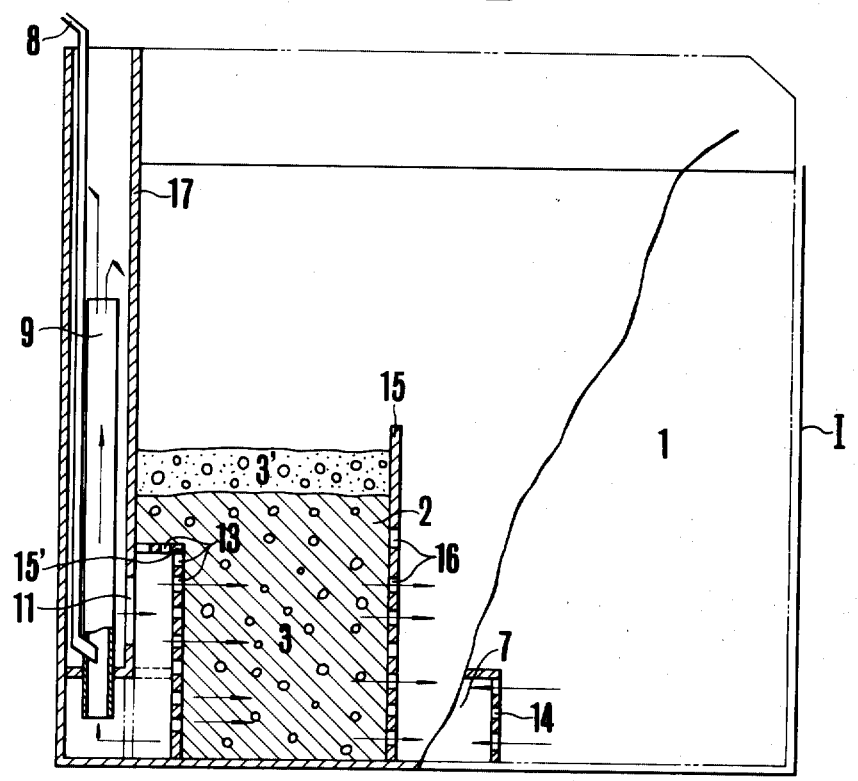
FIG. 2 is a side view, partly in cross-section, of the embodiment of FIG. 1.

A first embodiment of the aquarium according to the present invention will be described with reference to FIGS. 1 and 2. A partition plate 15 having a number of small holes 16 formed therein preferably provided with a net made of a synthetic resin is arranged upright on the bottom of an aquarium I preferably made of a transparent material. The partition plate 15 extends to around the middle of the depth of the aquarium I. Another partition plate 17 is disposed upright between the partition plate 15 and one wall of the aquarium I extending throughout the width of the aquarium I to define a feed chamber 6 with walls of the aquarium. The height of the partition plate 17 is larger than that of the aquarium. The parts of the walls of the aquarium defining the feed chamber along with the partition plate 17 are of the same height as the partition plate 17. Thus, these parts of walls are taller than the remaining parts of the walls of the aquarium so that the top part of the feed chamber 6 protrudes from the aquarium I in a box shape. An angled partition plate 15' having a number of small holes 13 throughout its area is fixed to a lower part of the plate 17 on the outer side relative to the feed chamber 6 and to the bottom of the aquarium I to define an open space chamber 4. The small holes 13 are preferably provided with a net made of a synthetic resin. The plate 17 has slits 11 extending substantially throughout its width and opening to the open space chamber 4. The plates 15, 17 and 15' and the bottom and side walls of the aquarium I define a filter chamber 2, which is taller than the open space chamber 4. The remaining space of the aquarium I constitutes a breeding chamber I.

An elongated box-shaped reflux path 7 is arranged on the bottom of the aquarium I extending through the plates 15, 15' and 17. The end plate of the reflux path 7 on the breeding chamber 1 side has a number of small holes 14 pierced therein, while a water-lifting tube 9 in the feed chamber 6 is inserted in the other end of the reflux path 7. A blast pipe 8 is communicating with a bottom part of the water-lifting tube 9.

The filtering chamber 2 is filled with a filter material or medium 3 having a lower resistance to the flow of water overlaid with a filter material 3' having a higher resistance. The feed chamber 6 includes a filtering material such as a net made of a synthetic resin, glass wool, or the like 24 for auxiliarily or preliminarily filtering water.

In operation, when air is sent to the lower part of the water-lifting tube 9 by the blast pipe 8, the water in the breeding chamber 1 is sucked through the small holes 14 and the reflux path 7 and lifted through the water-lifting tube 9. The lifted water is temporarily stored in the feed chamber 6 and then fed by the head produced in the feed chamber 6 by the blast to the breeding chamber 1 through the slits 11, the open space chamber 4, the small holes 13, the filter layer 3, and the small holes 16. The flow of water in the filter layer 3 is horizontal because the resistance of the upper layer 3' to the flow of water is higher than that of the lower layer 3. Only when the lower layer 3 is stopped up, water is by-passed to the upper layer 3'.

A second embodiment of the present invention illustrated in FIGS. 3 and 4 is similar to the first embodiment except that a reflector plate 20 is further provided in the breeding chamber 1 parallel to the partition plate 15 spaced apart therefrom to define a space chamber 18. Consequently, no description of similar parts and function will be repeated. The reflux path 7 passes through the reflector plate 20, too. The reflector plate 20 has a number of small holes 19 only at its lower part. Consequently, a greater part of the circulating water having passed through the small holes 16 in the plate 15 passes through the small holes 19 in the reflector plate 20 into the breeding chamber 1. However, a part of the circulating water strikes the reflector plate 20 to become an ascending current. The ascending current agitates the water existing above the filtering chamber 2 to accelerate the purification of water. The small holes 19 may be pierced in a part of the reflector plate 20 near the water surface instead of or in addition to being formed at the lower part of the plate 20.

A third embodiment of the present invention will be described with reference to FIGS. 5 and 6. In this case also no description of similar parts and function to the first and second embodiments will be repeated. In this embodiment the filter layer 3 in the chamber 2 of the first and second embodiments is replaced by pebbles. The filter layer 3' overlying the filter 3 is planted with aquatic plants, so that the chamber 2 is actually a plant culturing chamber having a filtering function. The feed chamber 6 in the first and second embodiments of the present invention described above is divided by a partition plate 23 to define a main filter chamber 25 with the plate 17. The filter chamber 25 is subdivided by vertical partition plates 21 having a number of small water-passing holes 22 into a number of alternate filter sections 29 and 29' and open spaces 28, 28' and 28" with both extremities being open spaces. The filter sections 29 and 29' are filled with a filter material. The partition plates 21 are shorter than the partition plate 23 so that a path 27 for overflow is formed over the filter chamber 25. The partition plate 23 has small holes 26 for passing water from the feed chamber 6 into the extreme open space 28.

The circulating water flowing from the feed chamber 6 into the open space chamber 4 passes through the alternate open spaces 28, 28' and 28" and filter sections 29 and 29'. In the plant culture chamber 2 the circulating water passes through the lower pebble layer 3 horizontally, because the upper aggregate layer 3" is of a higher density and provides more resistance to the flow of water which is supplemented by aquatic plants in the upper aggregate layer. However, the water passes through the upper aggregate layer 3', too, to some extent and does not stagnate there, so that there is no stagnant water and hence to cause any root rot of the plants. Even if the pebble layer 3 becomes stopped up in time, the filtering action of the culture chamber 2 is not reduced since water flows through the upper aggregate layer 3'. When the filter sections 29 and 29' become stopped up with a long use thereof, water flows over the filter sections 29 and 29' and the partition plates 21 through to the space 27 for overflow, at which time the water is exposed to air to absorb more oxygen, resulting in the advantage that the generation or breeding of anaerobic bacteria is prevented. If the water does not pass through the filtering sections 29 and 29', the pebble layer 3 in the plant culturing chamber 2 becomes stopped up sooner. However, even in this case, the filtering efficiency is not reduced. This is because, when the flow of water through the filter sections 29 and 29' is impossible, water flows and contacts a biotic membrane of filtering fungi which will be produced on the surface of the filtering aggregate therein so that the filtration of a part of the water is continued. If any sewage stops up the pebble layer 3 in the plant culturing chamber 2, the water passes through the aggregate layer 3'. Since the propagation of the filtering fungi in the aggregate 3' is proportional to the amount of oxygen supplied by the passing water, the filtering action of the arrangement according to the present invention is not reduced.

The reflector plate 20 may or may not be provided. When the reflector plate 20 is provided, the ascending current produced thereby as described above agitates the water existing above the plant culturing chamber 2. By this agitation not only the organic substance in the water contacts the membrane of the filtering fungi formed on the surface of the filtering aggregate 3' to be decomposed, but also the water absorbs air from its surface to further expedite the purification. If the reflector plate 20 has the small holes 19' at its upper part, the agitated or turbulent water flows in the breeding chamber 1 through the small holes 19' in the upper part of the reflector plate 20.

What is claimed is:

1. An aquarium, comprising a rectangularly block shaped tank having a bottom, substantially vertical side walls and substantially vertical end walls, a first substantially vertical partition plate coextensive in width with said end walls and spaced from said one side wall and defining a vertically elongated feed chamber with said one side wall on one side, said tank defining a breeder chamber on the opposite side of said partition plate from said one side wall, a second angled substantially vertical perforated second partition plate disposed alongside said first partition plate in said breeder chamber and having a first wall portion much shorter than and spaced away from said first partition plate and a second top portion extending from the top of said first wall portion to said first partition plate and enclosing an open spaced chamber between said second partition plate and said first partition plate, at least one third partition plate having openings therethrough and being coextensive in width with said end walls and spaced from said second partition plate in the direction of the opposite one of said side walls and being much shorter in height than said first partition plate and defining a filtering chamber at least partly overlying said second top portion and partly extending laterally of said first wall portion, a filtering material in said filtering chamber, a water lift tube disposed in said feed and having a bottom opening spaced upwardly from the bottom of said tank and a top opening spaced downwardly from the top of said tank, a fluid blast tube connected from the exterior of said tank into the lower portion of said lift tube and providing a blast of fluid into said tube whereby to produce an upward flow therein and the discharge of liquid at the top of said lift tube into said feed chamber, said feed chamber communicating adjacent its lower end with said free spaced chamber so that the increased head in said feed space produced by said blast tube causes a flow into said free space and upwardly and horizontally through said filtering chamber and through the openings in said third partition plate in accordance with the resistance of the filtering material in said filtering chamber, and means defining a reflex flow path adjacent the bottom of said tank for flow of liquid from said breeding chamber, through said filtering chamber and into said feed chamber adjacent the lower end thereof.

2. An aquarium according to claim 1, wherein said filtering material in said filtering chamber comprises a lower layer of coarse material and an upper layer of fine filtering material.

3. An aquarium according to claim 1, wherein said filtering material comprises a plant bed.

4. An aquarium according to claim 3, wherein said plant bed comprises a lower level of pebbles and an upper level of a sandy material.

5. An aquarium according to claim 1, wherein said at least one third partition plate includes a perforated plate defining an end of said filtering chamber and a reflector plate spaced away from said perforated plate in the direction of the opposite side wall of said tank, said perforated plates having perforations for the horizontal flow therethrough from said filtering material and for deflection and upward flow against a reflector plate.

6. An aquarium according to claim 4, wherein said reflector plate includes a plurality of openings adjacent the lower end thereof permitting some lateral flow in said breather chamber as well as upward flow by deflection against said reflector plate.

7. An aquarium according to claim 1, including a wall disposed between said first partition plate and said third partition plate and being substantially as high as said first partition plate and defining a main filter chamber between said wall and said first partition plate communicating on one side with said feed chamber and on an opposite side with said filtering chamber.

8. An aquarium according to claim 1, including a longitudinal division wall dividing said feed chamber into a small space containing said lift tube and a laterally elongated space containing a filtering material.

9. An aquarium according to claim 1 wherein said filtering material in said filtering chamber comprises means defining alternate filter sections and open space sections.

* * * * *